United States Patent [19]

Gibellina

[11] Patent Number: 4,750,764
[45] Date of Patent: Jun. 14, 1988

[54] FLOATING HOSE COUPLING

[76] Inventor: Michael C. Gibellina, 8350 E. Cherry Lynn, Scottsdale, Ariz. 85251

[21] Appl. No.: 74,268

[22] Filed: Jul. 16, 1987

Related U.S. Application Data

[63] Continuation of Ser. No. 737,272, Jun. 20, 1985, abandoned, which is a continuation-in-part of Ser. No. 630,836, Jul. 13, 1984, abandoned.

[51] Int. Cl.⁴ ............................................. F16L 33/22
[52] U.S. Cl. ...................................... 285/255; 285/908
[58] Field of Search ............... 285/249, 255, 245, 908

[56] References Cited

U.S. PATENT DOCUMENTS 3,226,137  12/1965  Trnka ............................... 285/255 X
4,157,843   6/1979  Trnka ............................... 285/255 X

FOREIGN PATENT DOCUMENTS 1802610  6/1970  Fed. Rep. of Germany ...... 285/255
2510218 11/1975  Fed. Rep. of Germany ...... 285/255

*Primary Examiner*—Dave W. Arola
*Attorney, Agent, or Firm*—Nissle & Leeds

[57] ABSTRACT

Coupling apparatus for forming a fluid tight connection with a hose. The coupling apparatus circumferentially sealingly engages a first section in the end portion of a hose when the hose end is pushed into contact with the apparatus. When the hose end is, after being initially pushed into sealing engagement with the coupling apparatus, pulled in a direction away from the apparatus, the apparatus circumferentially sealingly engages a second section of the end portion of the hose.

1 Claim, 2 Drawing Sheets

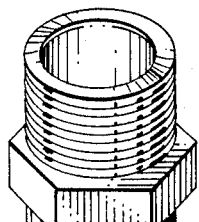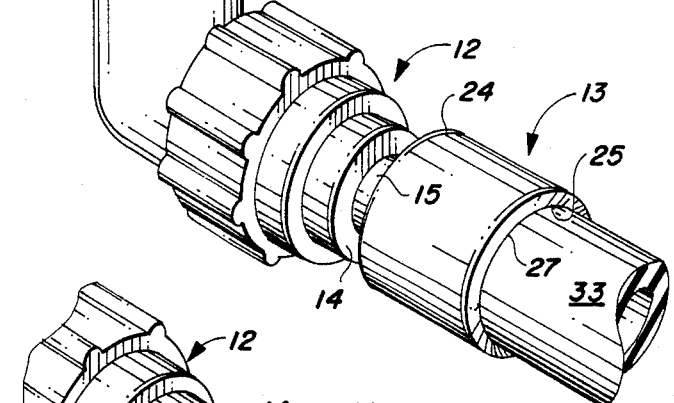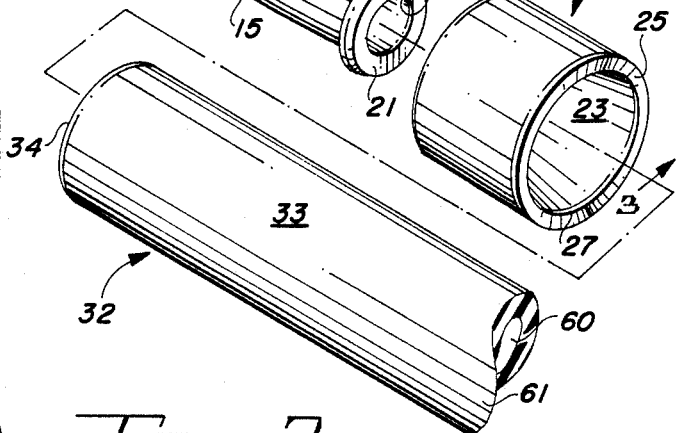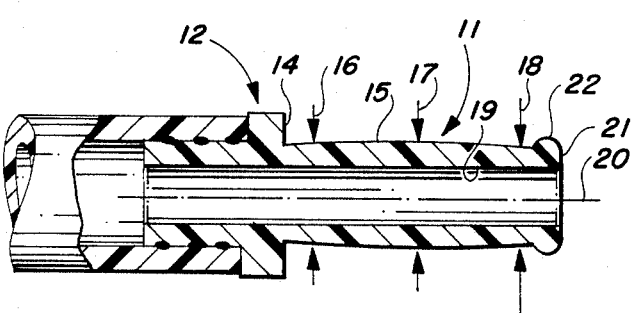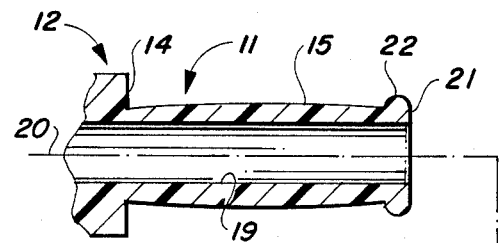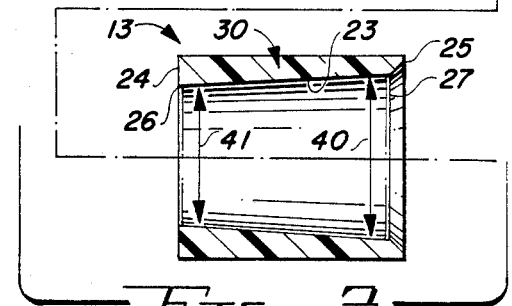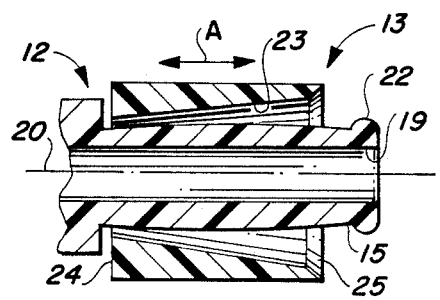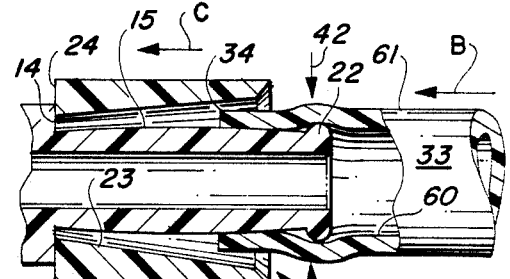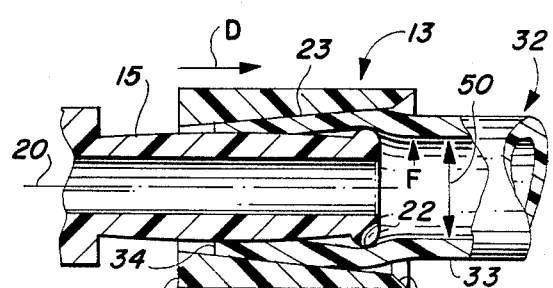

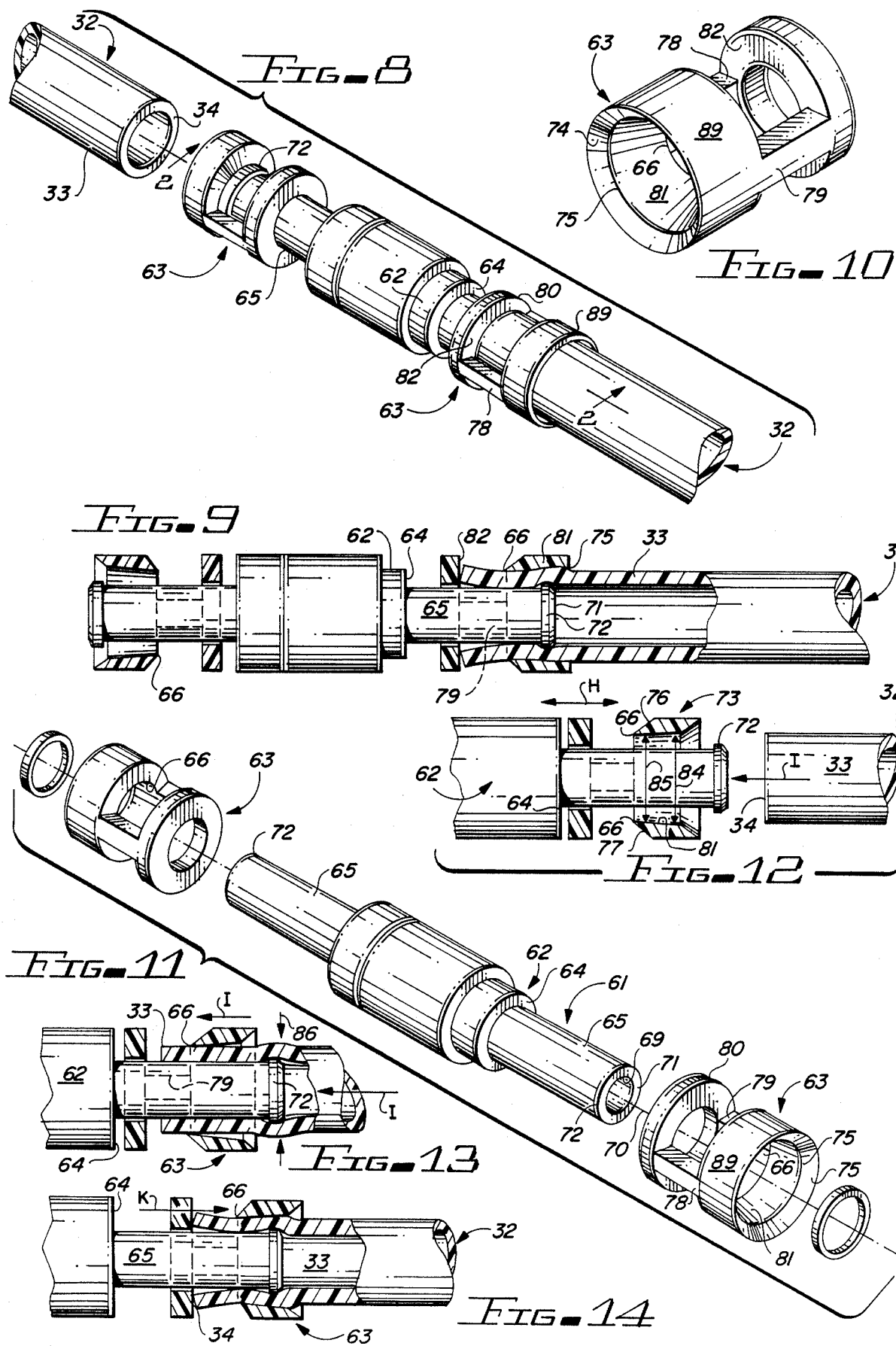

FLOATING HOSE COUPLING

This application is a continuation of my application for "FLOATING HOSE COUPLING", Ser. No. 06/737,272, filed June 20, 1985, now abandoned, which is a continuation-in-part of my application for "FLOATING HOSE COUPLING", Ser. No. 06/630,836, filed July 13, 1984, now abandoned.

This invention relates to coupling devices for a hose.

More particularly, the invention relates to coupling apparatus for providing a fluid tight connection with a flexible hose, the apparatus sealingly engaging a hose when an end portion of the hose is pushed into contact with the apparatus.

In a further respect, the invention relates to coupling apparatus which forms a pair of fluid tight seals with a hose by circumferentially compressing two separate sections of an end portion of the hose between opposing contact surfaces of the coupling apparatus, the first seal being accomplished when the hose is pushed into engagement with the coupling apparatus and the second seal being accomplished when the hose is, after being initially pushed into engagement with the coupling apparatus, pulled in a direction away from the apparatus.

In another respect, the invention relates to coupling apparatus which forms a fluid tight seal with a resilient hose by circumferentially compressing an end portion of the hose between a pair of opposing contact surfaces of the coupling apparatus and which, after forming a circumferential fluid tight seal with the end portion of the hose, permits the end portion of the hose to be moved back and forth along one of the opposing contact surfaces of the apparatus.

Hose coupling devices are well known in the art. See, for example, U.S. Pat. Nos. 4,238,123 to Palmaer, 1,106,542 to Buehner, 2,260,454 to Hedeman, 2,433,602 to Coss, 2,813,730 to Courtot, 3,885,819 to Egerer et al, 4,021,061 to Zimmerman, 4,313,629 to Winterhalter, and 4,321,911 to Offutt. Prior art coupling units generally include a nipple and a retainer sleeve. Securing the end of a hose to a prior art coupling device is a two step process. The end of a hose is first pushed over the nipple and is then secured on the nipple by positioning the retainer sleeve around the hose. A crimping tool or other hand tool is used to secure the retainer sleeve in position around the hose or, the retainer sleeve is manually slid into position over the hose end after the hose end is pushed over the nipple. Although connecting a hose to conventional coupling devices is a relatively simple process, it would be particularly useful and convenient if a hose could be securely attached to a coupling device by simply pushing an end of the hose into engagement with the coupling device. This would eliminate having to utilize hand tools and having to position a retainer ring or other component around the hose to secure the hose in place after it is initially positioned over the nipple of the coupling device.

Another limitation associated with conventional coupling devices is that once a hose end is attached to the device the hose end is fixed in position on the coupling device and cannot be moved back and forth along the nipple of the coupling device without breaking the fluid tight seal between the hose and coupling device. Being able to move the hose end with respect to the nipple and to maintain the fluid tight seal between the hose and coupling device while the hose end moves along the nipple would be advantageous because it would permit an individual to slacken or tighten a hose by simply adjusting the position of the end of the hose on the coupling nipple.

A further limitation of conventional coupling devices is that they often only circumferentially seal a hose to the coupling device at one point along the end portion of a hose. Sealing the end portion of a hose at two separate points would reduce the likelihood that fluid flowing through the hose and coupling would leak through the hose-coupling seal.

Accordingly, it would be highly desirable to provide improved coupling apparatus which would permit a hose to be sealingly attached to the apparatus by simply pushing an end of the hose into engagement with the apparatus.

It would also be highly desirable to provide improved hose coupling apparatus which would, when an end of a hose was pushed into engagement with the coupling apparatus and then pulled in a direction away from the apparatus, seal the hose to the coupling at two separate locations along the hose, and which would permit the end of the hose to be moved back and forth along the nipple of the coupling while maintaining the fluid tight seal between the coupling and hose end.

Therefore, it is a principal object of the invention to provide improved coupling apparatus for forming a fluid tight seal with a resilient hose.

A further object of the invention is to provide improved coupling apparatus which sealingly engages an end of a hose when the hose end is pushed into contact with the coupling.

Another object of the instant invention is to provide improved coupling apparatus which circumferentially seals the end of a hose to the coupling at two separate locations along the hose when the hose is pushed into engagement with the coupling and is then pulled in a direction away from the coupling.

Still a further object of the invention is to provide improved coupling apparatus which includes a component that sealingly engages an end of a hose and that can, along with the hose end, move back and forth on the coupling apparatus.

These and other, further and more specific objects and advantages of the invention will be apparent to those skilled in the art from the following detailed description thereof, taken in conjunction with the drawings, in which:

FIG. 1 is a perspective view of a hose-conduit assembly including coupling apparatus constructed in accordance with the principles of the invention;

FIG. 2 is an exploded perspective view illustrating the coupling apparatus of the invention and the end portion of a hose sealingly engaged by the coupling apparatus;

FIG. 3 is a side section assembly view of the coupling apparatus of FIG. 2 taken along section line 3—3 and illustrating the compression sleeve and nipple thereof;

FIG. 4 is a side view of the apparatus of FIG. 3 illustrating the compression sleeve positioned on the nipple of the apparatus;

FIG. 5 is a side view of the apparatus of FIG. 4 depicting the end portion of a hose being pushed into sealing engagement with the apparatus;

FIG. 6 is a side view of the apparatus of FIG. 4 after the end portion of a hose has been pushed into sealing engagement with both the compression sleeve and outer surface of the nipple and has then been pulled in a direction away from the coupling;

FIG. 7 is a side view of the nipple of the coupling apparatus sealingly secured to a conduit; and, FIGS. 8 to 14 illustrate an alternate embodiment of the coupling apparatus of FIGS. 1 to 7.

Briefly, in accordance with my invention, I provide an improved hose fitting assembly including an annular nipple for receiving a hose therearound and a compression sleeve carried on the nipple. The nipple includes a passage formed therethrough extending from a terminal end thereof; an axis extending through at least a portion of the passage beginning at the terminal end of the nipple; abutment means attached to the nipple and extending from the nipple away from the axis; a retainer ring spaced away from the abutment means and having an outer surface circumscribing the axis; and, a tubular surface circumscribing the axis and spanning the distance between and interconnecting the abutment means and the retainer ring, the outer surface of the retainer ring generally being spaced a greater distance away from the axis than the tubular surface. The compression sleeve is movably carried on the tubular surface of the nipple and includes a first end; a second end, the first end being positioned between the second end and the abutment means; apertures formed in the first and second ends, the aperture in the second end being sized such that an end of the hose can pass therethrough, the first aperture circumscribing the tubular surface; and, a passageway formed therethrough extending from the first end to the second end, interconnecting the apertures in the first and second ends, and including a frusto-conical surface tapering away from the second end toward the first end. The apertures in the first and second ends and the frusto-conical surface are shaped, contoured and dimensioned such that the compression sleeve can be positioned with the first end contacting the abutment means and can be displaced back and forth along at least a portion of the tubular surface in opposing first and second directions of travel generally parallel to the axis of the nipple. When the first end of the compression sleeve contacts the abutment means, the sleeve is prevented from being displaced along the tubular surface in the first direction of travel. The frusto-conical surface is sized such that when the nipple and abutment means are maintained in fixed position and an end of the hose is displaced in the first direction of travel over the retainer ring and through the aperture formed in the second end of the compression sleeve, the end of the hose contacts the frusto-conical surface and pushes the first end of the sleeve against the abutment means. After the compression sleeve is pushed against the abutment means with the end of a hose, the hose end is pressed further into the sleeve and is sealingly compressed between the frusto-conical surface and the tubular surface. The end of the hose generally remains sealingly compressed between the frusto-conical surface of the compression sleeve and the tubular surface and, the end of the hose and sleeve move in unison along the tubular surface in a second direction of travel opposite the first direction of travel when the hose is pulled in the second direction of travel.

The portion of the frusto-conical surface nearest the second aperture can have a diameter greater than the outer diameter of the portion of the hose contacting and circumscribing the outer surface of the retainer ring when the hose is pushed over the nipple, and the smallest diameter portion of the frusto-conical surface can have a diameter less than the outer diameter of the portion of the hose contacting the outer surface of the retainer ring. When the frusto-conical surface is sized in this manner, then a portion of the frusto-conical surface of the compression sleeve can be pulled over, circumscribe and cooperate with the outer surface of the retainer ring to sealingly compress the hose between the retainer ring and the compression sleeve. A portion of the frusto-conical surface of the compression sleeve can be pulled over the outer surface of the retainer ring after the end of the hose is pushed over the retainer ring through the aperture in the second end of the compression sleeve and against the frusto-conical surface thereof, and the compression sleeve is pushed against the abutment means by the end of the hose such that the first end of the sleeve contacts the abutment means, and the end of the hose is pushed into the compression sleeve and sealingly compressed between the frusto-conical surface and the tubular surface, and, the hose is pulled in the second direction of travel to draw the compression sleeve and the end of the hose along the tubular surface away from the abutment means.

Turning now to the drawings, which depict the presently preferred embodiment of the invention for the purpose of illustrating the practice thereof and not by way of limitation of the scope of the invention, and in which like reference characters refer to corresponding elements throughout the several views, FIGS. 1 to 7 illustrate the presently preferred embodiment of the invention including nipple 11, abutment 12 attached to nipple 11, and compression sleeve 13 movable carried on nipple 11. Abutment 12 includes circular surface 14 extending outwardly from generally cylindrical tubular surface 15 of nipple 11. Cylindrical surface 15 can be convex and bulge at the center such that in FIG. 7 dimension 17 is greater than dimensions 16, 18. As will be described, forming surface 15 in convex fashion facilitates the compressive sealing of the end portion of a hose between sleeve 13 and surface 15.

Passage 19 is formed through nipple 11 and has axis or centerline 20. Retainer ring 21 on nipple 11 includes outer surface 22 circumscribing axis 20. Passageway 30 extends from the first end 24 to the second end 25 of sleeve 13 and interconnects circular apertures 26, 27 formed in ends 24 and 25, respectively. Passageway 23 includes frusto-conical surface 23 tapering away from second end 25 toward first end 24 of sleeve 13. The diameter of aperture 26 is greater than the outer diameter of retainer ring 21 and compression sleeve 13 can be pushed over ring 21 and tubular surface 15 to the position shown in FIG. 4 and can be moved back and forth along surface 15 in the directions indicated by arrows A. The directions indicated by arrows A are parallel to centerline 20 of nipple 11.

The engagement of the end portion 33 of a flexible hose 32 with the coupling apparatus of the invention is depicted in FIGS. 5 and 6. During the process of engaging hose end 33 with the coupling apparatus of FIG. 4, it is assumed nipple 11 and abutment 12 generally remain in fixed position. As can be seen in FIG. 5, end portion 33 of hose 32 is pushed in the direction of arrow B over outer circumferential surface 22 of retainer ring 21. When hose end 33 is pushed over surface 22 in the direction of arrow B, leading circular edge 34 of hose 32 passes through aperture 27, contacts frusto-conical surface 23, and displaces sleeve 13 in the direction of arrow C until first end 24 of sleeve 13 contacts abutment surface 14. After first end 24 contacts surface 14, sleeve 13 generally remains in fixed position while pressure is applied to hose 32 to continue to force hose 32 in the direction of arrow B such that leading edge 34 is forced and compressed between frusto-conical surface 23 and tubular surface 15. After hose 32 is pushed in the direction of arrow B such that leading edge 34 is compressed between surfaces 23 and 15, a fluid tight seal is formed between hose 32 and the coupling apparatus of FIGS. 3 and 4.

The first fluid tight seal between hose 32 and the coupling apparatus of FIG. 4 is, as described above, formed by pushing end portion 33 of hose 32 in the direction of arrow B into engagement with and between surfaces 23, 15. Once the initial fluid tight seal has been formed by pushing hose end 33 in the direction of arrow B into engagement with the coupling apparatus of FIG. 4, hose 32 can be pulled in the direction of arrow D in FIG. 6. Pulling hose 32 in the direction of arrow D displaces sleeve 13 away from abutment surface 14 and causes sleeve 13 and leading edge 34 to move away from surface 14 in unison; leading edge 34 of hose end 33 does not move with respect to sleeve 13 but remains circumferentially compressed between surfaces 23 and 15 and slides over surface 15 when hose 32 is pulled in the direction of arrow D.

The largest diameter of surface 23 is indicated by arrows 40 in FIG. 3. The smallest diameter of surface 23 is represented by arrows 41. The outer diameter of the portion of hose end 33 contacting outer surface 22 of ring 21 at any given time is indicated by arrows 42 in FIG. 5. The distance represented by arrows 40 is greater than the distance represented by arrows 42. The distance represented by arrows 41 is less than the distance represented by arrows 42. Consequently, when hose 32 is pulled in the direction of arrow D after leading edge 24 has been pushed into engagement with the coupling apparatus of FIG. 4 and compressed between surfaces 23 and 15, sleeve 13 and hose end 33 move in unison away from surface 14 and end portion 33 is sealingly circumferentially compressed between surfaces 23 and 22. Thus, pushing hose end 33 in the direction of arrow B into engagement with the coupling apparatus of FIG. 4 and then pulling hose end 33 in the direction of arrow D away from abutment surface 14 forms circumferential seals at two separate sections of hose end 33. One circumferential seal is formed at the section of hose end 33 compressed between surfaces 15 and 23 while a second circumferential seal is formed at the section of hose end 33 compressed between surfaces 22, 23.

If, after hose end 33 is pushed into engagement with the coupling apparatus of FIG. 4 and then pulled to the position shown in FIGS. 1 and 6, end 33 is again pushed in the direction of arrow B toward surface 14, sleeve 13 and hose end 33 will generally move in unison in the direction of arrow B, releasing the fluid tight seal between surfaces 23 and 22 but maintaining the fluid tight seal between surfaces 23 and 15. Hose end 33 can be repeatedly pushed and pulled to move sleeve 13 and leading end 34 back and forth along tubular surface 15 in unison while maintaining a "floating" fluid tight seal between surfaces 15 and 23. Since the diameter of the central portion of convex tubular surface 15 is greater than the diameter of the end portions of surface 15, pulling hose 32 and sleeve 13 in the direction of arrow D after leading edge 34 has initially been pushed into sealing engagement between surface 15 and 23 tends to further compress hose end 33 between surfaces 15 and 23 and to improve the seal therebetween.

Although one or more circumferential grooves circumscribing axis 20 may be formed in surface 15 and 23, surface 15 is preferably smooth to facilitate the sliding, floating seal of the coupling apparatus of the invention. Frusto-conical surface 23 is also generally smooth to facilitate the pressing of leading edge 34 of hose end 33 between surfaces 15 and 23. Surface 23 can be serrated to help prevent hose end 33 from being pulled free from between surfaces 15, 23 when hose 32 is pulled in the direction of arrow D after edge 34 has been initially pushed and compressed between surface 15 and 23. The formation of such serrations in surface 23 generally would not hinder travel of hose end 33 between surfaces 23, 15 in the direction of arrow B in FIG. 5, but would "bite" into the outer surface of hose end 33 if hose 32 were pulled in the direction of arrow D while sleeve 13 was held stationary.

The outer diameter of retainer ring 21 can be greater than, equal to, or less than the inner diameter 50 of hose 32. In FIGS. 5 and 6 the outer diameter of ring 21 is greater than the inner diameter of hose 32. The diameter 17 of tubular surface 15 is less than the outer diameter of ring 21. The lesser diameter 41 of surface 23 is both less than the outer diameter 42 of hose end 33 contacting surface 22 and properly sized to sealingly circumferentially compress end 34 against surface 15 when sleeve 13 and edge 34 are moved back and forth along tubular surface 15 in unison.

As illustrated in FIG. 5, when hose end 33 is pushed over ring 21 leading edge 34 contacts surface 23 and forces end 24 of sleeve 13 against abutment wall 14. Continuing to push hose end 33 into sleeve 13 in the direction of arrow B after end 24 contacts abutment wall 14 sealingly circumferentially compresses leading edge 34 between surfaces 23 and 15. If desired, surface 23 can be sized such that when hose end 33 is pushed into sleeve 13 after end 24 contacts wall 14, leading edge 34 is compressed and constricted by surface 23 but is not compressed against surface 15 and between surfaces 23, 15. When leading edge 34 is only compressed by surface 23 and is not compressed against surface 15 by surface 23, a fluid tight seal is formed between the outer surface 61 of the end portion of hose 32 and surface 23 and is not formed between the inner surface 60 of hose 32 and surface 15. If leading edge 34 is only compressed by surface 23 and is not compressed between surfaces 23 and 15, sleeve 13 and hose end 33 can still be moved in unison back and forth along surface 15 in the manner earlier described.

When sleeve 13 and hose end 33 are in the position illustrated in FIG. 6, end 25 of sleeve 13 extends out past retainer ring 21 so that the pressure, indicated by arrow F, of fluid coursing through resilient hose 32 sealingly forces outer surface 61 of hose 32 against a portion of surface 23 of sleeve 13.

An alternate embodiment of the invention is depicted in FIGS. 8 to 14 and includes nipple 61, abutment 62 connected to nipple 61, and compression sleeve 63 movably carried on nipple 61. Abutment 62 includes circular surface 64 extending outwardly from generally cylindrical tubular surface 65 of nipple 61. Cylindrical surface 65 can be convex and bulge at the center in the manner of nipple 11 in FIG. 7. Passage 69 is formed through nipple 61 and has axis 70. Retainer ring 71 on nipple 61 includes outer surface 72 circumscribing axis 70. Passageway 73 extends from circular aperture 75 in end 74 of compression sleeve 63 to inner circular aperture 66 which is adjacent to semicircular openings 76 and 77 formed in sleeve 63. Arms 78, 79 interconnect the circular ring-shaped end 80 of sleeve 63 with outer circular wall 89 of sleeve 63. Passageway 73 includes frusto-conical surface 81 which tapers from aperture 75 to aperture 66 in compression sleeve 63. The diameter of aperture 66 is preferably slightly less than the outer diameter of hose 32 such that resilient hose 32 can be forced through aperture 66 but is slightly compressed by aperture 66 to induce and promote the outward flaring of end 33 of hose 32 into openings 76 and 77 formed in compression sleeve 63 (FIGS. 2 and 7). The flaring of surface 34 of hose 32 into openings 76 and 77 facilitates the production of a fluid tight seal between the outer surface of hose 33 and the circular edge circumscribing and defining aperture 66.

As described above, a pair of fluid tight seals between hose 32 and the coupling apparatus of FIG. 11 are formed by pushing end portion 33 of hose 32 in the direction of arrow I and into sealing engagement with frusto-conical surface 81 and the circular edge or lip of aperture 66 of compression sleeve 63. After these fluid tight seals have been formed by pushing hose end 33 in the direction of arrow I and into engagement with the coupling apparatus of FIG. 11, hose 32 is pulled in the direction of arrow K in FIG. 14. Pulling hose 32 in the direction of arrow K displaces sleeve 63 and hose end 33 away from abutment surface 64 and causes sleeve 63 and hose end 33 to move away from surface 64 in unison; hose and 33 generally does not move with respect to sleeve 63 but remains circumferentially compressed by the circular edge of aperture 66 and wall 81.

The largest diameter of frusto-conical surface 81 is indicated by arrows 84 in FIG. 12. The smallest diameter of surface 81 is represented by arrows 85. The outer diameter of the portion of hose end 33 contacting outer surface 72 of ring 21 at any given time is indicated by arrows 86 in FIG. 13. The distance represented by arrows 84 is generally equal to or greater than the distance represented by arrows 86. Consequently, when hose 32 is pulled in the direction of arrow K after end 33 has been pushed in the direction of arrow I into engagement with the coupling apparatus of FIG. 11, sleeve 63 and hose end 33 move in unison away from surface 64 and hose end 33 is sealingly circumferentially compressed between surfaces 81 and 72.

When the embodiment of the invention depicted in FIGS. 8–14 is utilized and end 33 of hose 32 is pushed in the direction of arrow I into engagement with the coupling apparatus of FIG. 11 and end 33 is then pulled in the direction of arrow K away from abutment surface 64, fluid-tight circumferential seals are formed at three separate sections of hose end 33. A first circumferential seal is formed at the section of hose end 33 compressed between surface 81 along passageway 73, a second circumferential seal is formed between the circular peripheral edge of aperture 66 and the outer surface of end 33 of hose 32, and, a third circumferential seal is formed at the section of hose end 33 compressed between surfaces 81 and 72.

Having described my invention in such terms as to enable those skilled in the art to understand and practice it, and having identified the presently preferred embodiments and best mode thereof, I claim:

1. A hose fitting assembly including
    (a) an annular nipple for receiving a hose therearound and having
        (i) a passage therethrough extending from a terminal end thereof,
        (ii) an axis extending through at least a portion of said passage beginning at said terminal end,
        (iii) abutment means attached to said nipple and extending from said nipple away from said axis,
        (iv) a retainer ring spaced away from said abutment means and having an outer surface circumscribing said axis,
        (v) a tubular surface circumscribing said axis and spanning the distance between and interconnecting said abutment means and said retainer ring, said outer surface of said retainer ring generally being spaced a greater distance away from said axis than said tubular surface;
    (b) a compression sleeve movably carried on said tubular surface and having
        (i) a first end,
        (ii) a second end, said first end being positioned between said second end and said abutment means,
        (iii) apertures formed in said first and second ends, said aperture in said second end being sized such that an end of said hose can pass therethrough, said first aperture circumscribing said tubular surface,
        (iv) a passageway formed therethrough extending from said first end to said second end, interconnecting said apertures in said first and second ends, and including a frusto-conical surface tapering away from said second end toward said first end, said apertures in said first and second ends and said frusto-conical surface being shaped, contoured and dimensioned such that said compression sleeve can be
            positioned with said first end contacting said abutment means, and
            displaced back and forth along at least a portion of said tubular surface in opposing first and second directions of travel generally parallel to said axis,
        said sleeve being prevented from being displaced along said tubular surface in said first direction of travel when said first end of said sleeve contacts said abutment means,
        said frusto-conical surface being sized such that when said nipple and abutment means are maintained in fixed position and an end of said hose is displaced in said first direction of travel over said retainer ring and through said aperture formed in said second end of said compression sleeve,
        said end of said hose contacts said frusto-conical surface and pushes said first end of said sleeve against said abutment means, and
        said hose is, after said sleeve is pushed against said abutment means, pressed further into said sleeve and sealingly compressed by said frusto-conical surface,
        said end of said hose generally remains sealingly compressed by said frusto-conical surface, and, said end of said hose and said compression sleeve move in unison along said tubular surface in a second direction of travel opposite said first direction of travel when said hose is pulled in said second direction of travel;
    (c) the portion of said frusto-conical surface nearest said second aperture having a diameter greater than the outer diameter of the portion of said hose contacting and circumscribing said outer surface of said retainer ring when said hose is pushed over said nipple; and (d) the smallest diameter portion of said frusto-conical surface having a diameter less than said outer diameter of said portion of said hose contacting said outer surface;

such that after said end of said hose is pushed over said nipple in said first direction of travel and said end of said hose is pushed over said retainer ring through said aperture in said second end of said compression sleeve and against said frusto-conical surface thereof, and said compression sleeve is pushed against said abutment means by said end of said hose such that said first end of said sleeve contacts said abutment means, and said end of said hose is pushed into said compression sleeve and sealingly compressed by said frusto-conical surface, and said hose is pulled in said second direction of travel to draw said compression sleeve and said end of said hose along said tubular surface away from said abutment means, a portion of said frusto-conical surface of said compression sleeve is pulled over, circumscribes and cooperates with said outer surface of said retainer ring to sealingly compress said hose between said retainer ring and said compression sleeve;

(e) at least one opening formed in said compression sleeve, a portion of said end of said hose outwardly flaring into said opening when said end of said hose is pushed into said compression sleeve; and, (f) an arcuate edge adjacent said opening, said hose sealingly bearing against said arcuate edge when said portion of said end of said hose outwardly flares into said opening.

* * * * *